W. F. KELLS.
FAUCET.

No. 172,631. Patented Jan. 25, 1876.

Witnesses
Geo. H. Strong.
John L. Boone.

Inventor
William F. Kells
by Dewey & Co.
Attys.

UNITED STATES PATENT OFFICE.

WILLIAM F. KELLS, OF SAN FRANCISCO, CALIFORNIA.

IMPROVEMENT IN FAUCETS.

Specification forming part of Letters Patent No. 172,631, dated January 25, 1876; application filed August 4, 1875.

*To all whom it may concern:*

Be it known that I, WILLIAM F. KELLS, of San Francisco city and county, State of California, have invented a Tap and Faucet for Barrels; and I do hereby declare the following description and accompanying drawings are sufficient to enable any person skilled in the art or science to which it most nearly appertains to make and use my said invention without further invention or experiment.

My invention relates to an improved construction of tap and faucet for draining liquids from casks, which will be more fully described in the following specification, reference being had to the accompanying drawings, in which—

Figure 1:
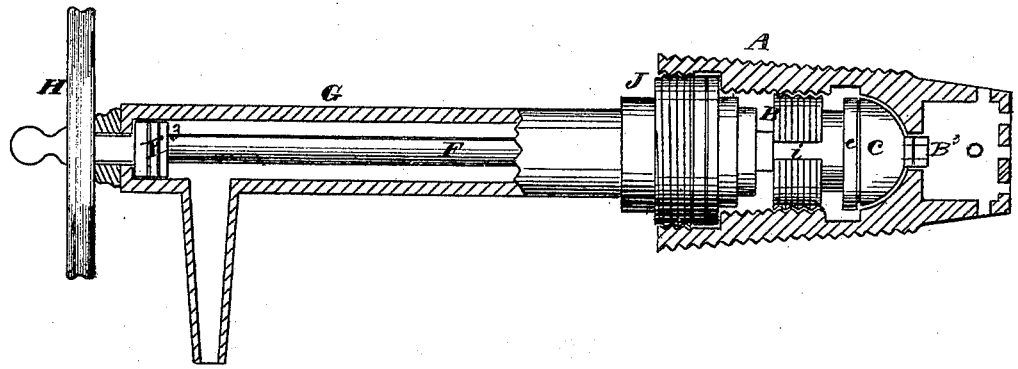
Figure 2:
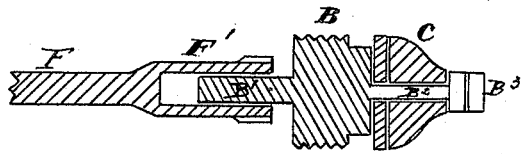
Figure 2:
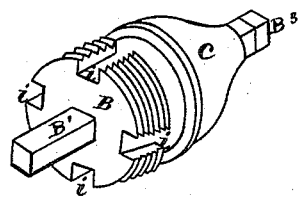

Figure 1 is a longitudinal section of my device. Fig. 2 is a section of the valve-plug and wrench. Fig. 3 is a view of the plug and valve.

A is a hollow plug or socket, which is screwed into the cask, its inner end being perforated to admit the liquid, while by means of a screw cut in its outer end it serves as a permanent attachment into which the faucet can be secured.

Within this socket a conical seat is formed, and a screw-plug, B, (which moves in threads cut for it within the socket,) serves to operate the valve C. This valve is preferably made of rubber or other elastic material, and is conical or semi-globular in form, so as to present a considerable surface to the seat, for a purpose to be hereafter explained.

The valve is fitted around the spindle $B^2$ of the plug B, and is held in its place by jam-nuts $B^3$, as shown.

A washer, $e$, lies between the valve and the shoulder of the plug, so that when the valve rests upon its seat the plug may turn a little independently of the valve.

In order to operate this plug and open this valve to draw liquid I use a wrench, F, which has a long stem extending through the faucet, as shown, and is turned from the outside by a small hand-wheel, H.

The plug has a square stem, $B^1$, upon its rear end, and the key or wrench F is provided with an enlargement, $F^1$, which fits over this stem $B^1$, so that it can easily be turned from the outside, grooves or channels $i$ being formed in the periphery of the enlargement $F^1$ for the passage of liquid to the faucet G.

Slots or grooves $i\ i$ are made in the sides of the plug to allow the liquid to pass after the valve is open, and similar slots may be made in the sides of the wrench if it nearly fills the faucet.

In order to secure the faucet and make a tight joint it has a flange upon its end and an elastic washer below it, which rests upon a seat within the socket A. A loosely-turning nut, J, surrounding the faucet, is screwed into the end of the socket, and this forces the elastic washer closely to its seat and makes a tight joint.

The outer end of the wrench-stem F has a collar, $F^2$, just within the end of the faucet G, and this serves to hold an elastic washer closely against the inside of the end, so that no liquid can escape.

It will thus be seen that, by turning the hand-wheel H, I am enabled to open the valve C and graduate the amount of opening very minutely.

By constructing this valve with a considerable bearing-surface, as at first described, I am enabled, by opening it very slightly, (as the thickness of a cord,) to dissipate the gas and allow the liquid to be drawn directly from the cask without foam, or in what is known as a solid condition.

The construction of this faucet allows it to be very readily taken apart to be cleaned; but its most valuable feature is the minute adjustability.

Having thus described my invention, what I claim, and desire to secure by Letters Patent, is—

1. The combination, with the hollow plug A, faucet G, and nut J, of the wrench F, formed with collar $F^3$, enlargement $F^1$, and grooves or channels $i\ i$, and conical or semi-globular valve C, provided with flange $e$, and operated by a screw-plug, B, provided with slots $i$, stem $B^1$, and spindle $B^2$, substantially as shown and described.

2. The combination, with a hollow plug, A, of a conical or semi-globular valve, C, provided with a valve, $e$, and supported on a spindle, $B^2$, carried by a screw-plug, B, having slots $i$ in its periphery, the said plug being caused to revolve by means of a stem, $B^1$, held in the enlargement $E'$ of a wrench, F, substantially as and for the purpose set forth.

In witness whereof I hereunto set my hand and seal.

WILLIAM FERRES KELLS. [L. S.]

Witnesses:
 GEO. A. STRONG,
 J. L. BOONE.